United States Patent [19]

Shurling, Jr.; Dickey S. et al.

[11] Patent Number: 5,458,680
[45] Date of Patent: * Oct. 17, 1995

[54] METHOD OF PRODUCING AGGREGATED COMPOSITE PIGMENTS USING ORGANIC SILICON COMPOUNDS

[75] Inventors: Dickey S. Shurling, Jr., Sandersville, Ga.; Vincent F. Newberry, Appleton, Wis.

[73] Assignee: ECC International, Inc., Atlanta, Ga.

[*] Notice: The portion of the term of this patent subsequent to Mar. 29, 2011 has been disclaimed.

[21] Appl. No.: 218,501

[22] Filed: Mar. 25, 1994

Related U.S. Application Data

[63] Continuation-in-part of Ser. No. 20,982, Feb. 22, 1993, Pat. No. 5,298,066, which is a continuation-in-part of Ser. No. 877,541, May 1, 1992, Pat. No. 5,232,495.

[51] Int. Cl.[6] ............................ C09C 3/12; C08K 3/34; C08K 9/08; C08K 9/06
[52] U.S. Cl. ............................ 106/487; 106/416; 106/442; 106/464; 106/465; 106/468; 106/486; 428/454; 501/141; 501/144; 501/145; 501/146; 501/147; 501/148; 501/149
[58] Field of Search ................... 106/416, 442, 106/464, 465, 437, 468, 486, 487; 428/454; 501/141, 144, 145, 146, 147, 148, 149

[56] References Cited

U.S. PATENT DOCUMENTS

| | | | |
|---|---|---|---|
| 3,364,059 | 1/1968 | Marzocchi | 428/391 |
| 3,567,680 | 3/1971 | Iannicelli | 524/262 |
| 3,834,924 | 6/1972 | Grillo | 106/490 |
| 3,894,882 | 7/1975 | Takewell et al. | 106/485 |
| 4,026,762 | 5/1977 | Bauman | 162/181.2 |
| 4,028,173 | 6/1977 | Olson | 162/181.2 |
| 4,381,948 | 5/1983 | McConnell et al. | 106/416 |
| 4,818,294 | 4/1989 | Raythatha et al. | 106/487 |
| 4,826,536 | 5/1989 | Raythatha et al. | 106/485 |
| 4,935,062 | 6/1990 | Brown et al. | 106/487 |

*Primary Examiner*—Mark L. Bell
*Assistant Examiner*—Scott L. Hertzog
*Attorney, Agent, or Firm*—Klauber & Jackson

[57] ABSTRACT

An improved process for producing a aggregated composite pigment having desired physical and optical characteristics when used as a coating, filler or pigment in paper. The aggregated pigment is produced by contacting a substantially dry fine particle size mixture of kaolin and one or more additional feed minerals with a previously hydrolyzed organic silicon compound, such as hydrolyzed tetraethoxysilane, and then recovering the aggregated composite pigment.

28 Claims, 2 Drawing Sheets

FIGURE 1
PSD COMPARISION OF 5% GCC SAMPLES

FIGURE 2
PSD COMPARISION OF 5% TiO2 SAMPLES

FIGURE 3
SEDIGRAPH COMPARISION FOR 20% PCC

FIGURE 4
PSD COMPARISION FOR 50/25/25% SAMPLES

METHOD OF PRODUCING AGGREGATED COMPOSITE PIGMENTS USING ORGANIC SILICON COMPOUNDS

RELATED APPLICATIONS

This application is a continuation-in-part of our commonly assigned application Ser. No. 08/020,982, filed Feb. 22, 1993, now U.S. Pat. No. 5,298,066, which in turn is a continuation-in-part of Ser. No. 07/877,541, filed May 1, 1992, now U.S. Pat. No. 5,232,495.

BACKGROUND OF THE INVENTION

This invention relates to the preparation of chemically aggregated composite pigments, using organo-silicon compounds. The products are useful as fillers and in coatings for paper.

The aggregated composite mineral pigments of this invention are prepared from a starting feed mixture of a fine particle size kaolin with one or more fine particle size pigments such as a calcium carbonate and/or titanium dioxide. In our U.S. Pat. No. 5,298,066, application, it is primarily kaolin which is aggregated and such technology is broadly relevant to the present invention.

Kaolinite occurs naturally as clay, which is mined and processed to produce kaolin pigments for use in paper filling and paper coating applications. In general, the objectives of using a kaolin pigment are to improve qualities of the paper product, such as opacity, brightness, smoothness, printing, porosity, surface coverage, light scatter, and to reduce the cost of paper manufacturing. Various methods are commonly employed to enhance the performance of a given kaolin pigment. Among these are calcining and chemical aggregating methods which improve the brightness and opacity imparted to paper by a given kaolin pigment.

The brightness and opacity imparted to paper by a given kaolin (or other mineral) filler are quantitatively related to a property of the filler identified as the "scattering coefficient S." This scattering coefficient S of a given filler pigment is a property well known and extensively utilized in the paper technology art, and has been the subject of numerous technical papers. The early exposition of such measurements was made by Kubelka and Munk, and is reported in Z. Tech Physik 12:539 (1931). Further citations to the applicable measurement techniques and detailed definitions of the said scattering coefficient are set forth at numerous places in the patent and technical literature. Reference may usefully be had in this connection, e.g., to U.S. Pat. Nos. 4,026,726, and 4,028,173. In addition to the citations set forth in these patents, reference may further be had to *Pulp and Paper Science Technology,* Vol. 2, "Paper" Chapter 3, by H. C. Schwalbe (McGraw-Hill Book Company, N.Y.).

In a filled paper, higher light scattering allows paper to look more opaque without increasing light absorption. The use of pigment with a higher light scattering coefficient allows reduction in either the basis weight or amount of filler required to achieve targeted properties; for example, opacity and brightness. Traditionally, this has been achieved using titanium dioxide, calcined clays and precipitated calcium carbonate. The relatively higher light scattering of titanium dioxide is due to higher refractive index. Higher light scatter observed with calcined kaolin and precipitated calcium carbonate is believed to be due to the intrinsic porous structure developed during the process of manufacturing of these pigments. See McConnell et al., U.S. Pat. No. 4,381,948.

In general, the attempt to increase light scatter by modification of the kaolinite mineral also induces some increase in pore void volume. In addition, such modification can produce pigments with particle size distribution in a fairly narrow range. For example, calcining of fine kaolinite above its dehydroxylation point can produce a product with increased pore void volume. In U.S. Pat. No. 4,826,536, issued May 2, 1989, to Raythatha et al., similar aggregation is achieved chemically by reacting fine kaolinite clay with rapidly hydrolyzing metal chlorides. The acidic byproduct of this reaction may be neutralized with gaseous ammonia. In Raythatha et al., U.S. Pat. No. 4,818,294, and in Brown et al., U.S. Pat. No. 4,935,062, similar aggregates may be produced by reaction with organo-silicon compounds that are non-corrosive and produce no solid byproducts. The light scattering coefficient and pore void volumes of these clays are significantly higher than the starting kaolinite material.

Marginal increase in light scatter (generally less than 10 units) may be induced by mixing kaolinite particles of different size or by chemical flocculation. However, these structures are generally unstable and would break down under the high shear stress of paper making or paper coating.

Aside from use as fillers, the aggregated pigments are used in paper coating to improve surface coverage. The application of such pigments can lead to a smoother surface, higher porosity, gloss and print properties. In Raythatha U.S. Pat. No. 4,818,294, a chemically aggregated kaolin pigment is shown to significantly increase coated sheet properties, especially paper and print gloss.

In more detail, in U.S. Pat. No. 4,381,948, to McConnell et al., a calcined kaolin pigment and a method for manufacture of same are disclosed. The said pigment consists of porous aggregates of kaolin platelets, and exhibits exceptionally high light scattering characteristics when incorporated as a filler in paper. This pigment, which substantially corresponds to the commercially available product ALPHATEX® of the present assignee, ECC International Inc. (Atlanta, Ga.), is prepared by first blunging and dispersing an appropriate crude kaolin to form an aqueous dispersion of same. The blunged and dispersed aqueous slurry is subjected to a particle size separation from which there is recovered a slurry of the clay, which includes a very fine particle size; e.g. substantially all particles can be smaller than 1 micrometer E.S.D. The slurry is dried to produce a relatively moisture-free clay, which is then thoroughly pulverized to break up agglomerates. This material is then used as a feed to a calciner; such feed is calcined under carefully controlled conditions to typical temperatures of at least 900° C. The resulting product is cooled and pulverized to provide a pigment of the porous high light scattering aggregates of kaolin platelets as described.

Calcined kaolin products, including those of the aforementioned ALPHATEX® type, are seen to be manufactured by relatively complex techniques involving a multiplicity of steps, including specifically a calcining step, plus various preparatory steps and post-calcining steps. Thus, the said product is relatively expensive to produce, and requires considerable investment in complex apparatus and the like; e.g. highly regulated calciners, etc. The particle size in the feed to the calciner must be carefully controlled, because a relatively small increase in coarseness of such feed can have very marked detrimental effect on Valley abrasion. Furthermore, calcination per se will produce an abrasive product if overheating occurs. Consequently, the conditions of prepa- ration of calcined materials must be very carefully controlled in order to keep abrasion acceptably low in the calcined product.

In Raythatha U.S. Pat. No. 4,826,536, a process is disclosed in which a fine particle size kaolin is reacted in particulate form with a metal chloride, such as silicon tetrachloride, to form a chemically aggregated structured kaolin pigment. The metal chloride may be one or more of the chlorides having the general formula $MCl_x$, where M is Si, Ti or Al; and X is 3 or 4 depending on the valence of M. Heating may optionally be used to shorten the reaction time. When so used, temperatures generally will not, however, exceed about 150° C. In order to complete the polymerization and condensation which is thought to occur, it is preferable to age the resulting product for a period, typically at least three days. In another aspect of that process, additional improvements in the products are found to occur by the addition of ammonia to the combined kaolin and metal chloride.

Thus Raythatha U.S. Pat. No. 4,826,536, describes methods of preparing chemically aggregated kaolinite pigment using very reactive metal chlorides such as silicon tetrachloride and titanium tetrachloride. The application of such reactive metal chloride leads to aggregated products that give enhanced optical and printability properties for filled and coated papers. However, due to the nature of the aggregating chemical, very specialized equipment and processing steps are required. In addition, the resultant by-products are difficult to remove by ordinary methods. Furthermore, the aggregated kaolinite pigment product cannot be dispersed effectively in water at solids contents above 50 weight percent, which is an impediment to their shipping and use.

In Raythatha U.S. Pat. No. 4,826,536, free moisture present in the particulate feed is useful to initiate at least a partial hydrolysis of the metal chloride or chlorides. The patentee indicates that if the moisture level is too high, however, it can diminish or impair the efficiency of the aggregation process. Thus in the instances where silicon and/or titanium chlorides are used, if the moisture level is too high relative to the metal chloride(s), then the hydrolysis products from the metal chlorides will predominantly precipitate as the metal oxide, i.e. as silica gel and/or titania. In the case of aluminum trichloride, if the moisture level is too high relative to the metal chloride, then the dilution of the finally resulting aluminum hydroxide (in the presence of ammonia) can be so high as to cause inefficient aggregation.

Raythatha U.S. Pat. No. 4,818,294, discloses a method of producing aggregated kaolin pigments using organo-silicon compounds either singly or in combination. In general, the compounds may be selected from symmetric compounds having the formula where R=$CH_3$, $C_2H_5$, $C_3H_7$, N--$C_4H_9$ sec-$C_4H_9$ and $C_6H_5$ and asymmetric compounds having the formula where R=$C_2H_5$, X=Cl or Br, and R'=H.

In a typical process, substantially dry kaolin mineral is treated with an effective amount of an organo-silicon compound such as silanes having the formula $(RO)_4Si$, where R is a lower alkyl group of 1 to 4 carbon atoms; e.g., methyl ($CH_3$) or ethyl ($CH_3CH_2$). The R groups in the silane can be the same or different. The resulting products exhibit increased light scatter, improved wet void volume and bulk, and have a structure that is strong enough to withstand the high shear forces of paper making and paper coating. The amount of organic silicon compound may range from 0.1 to 3.0%, preferably from 0.2 to 2.0% by weight of dry kaolin.

Raythatha U.S. Pat. No. 4,818,294, also teaches that aggregation enhancing chemicals, comprising alkaline earth metal salts and lithium chloride, may optionally be used, in amounts in the range of 0.05 to 3.0%, typically 0.05 to 2% by weight of the salt based on the weight of the dry kaolin.

Raythatha U.S. Pat. No. 4,818,294, further teaches that feed moisture is typically in the range of 1 to 2%, preferably 1.0 to 1.75%, by weight of the feed clay. The most preferred range is 1.5 to 1.75% by weight of the clay. Brown No. 4,935,062, a continuation-in-part of Raythatha U.S. Pat. No. 4,818,294, discloses that the organo-silicon compounds of Raythatha U.S. Pat. No. 4,818,294, are useful for producing aggregated kaolin pigments by the method of the Raythatha U.S. Pat. No. 4,818,294, patent when the moisture content of the feed is increased into the range of 2.0 to 5.0% by weight of the clay. Brown further teaches that moisture content above 5% causes the clay to become sticky and difficult to handle.

Thus Raythatha U.S. Pat. No. 4,826,536, Raythatha U.S. Pat. No. 4,818,294, and Brown U.S. Pat. No. 4,935,062, all disclose and teach that aggregated kaolin pigments can be produced by treating a kaolin clay with organo-silane or metal chloride compounds in the presence of a quantity of water that is sufficient to hydrolyze and polymerize the organo-silane or metal chloride compounds, i.e. up to about 5% of the weight of clay. These patents teach that it is necessary to restrict the amount of moisture used, and Raythatha U.S. Pat. No. 4,826,536, teaches that when higher amounts of moisture are present the hydrolysis products formed are ineffective for producing aggregated pigment.

Using the prior art of Brown U.S. Pat. No. 4,935,062, one would process the crude clay to a dried product, and then mix in the selected organo-silane to produce an aggregated product. In practice this procedure has been found to require an aging period of at least three days from the time the clay is treated until it can be used—e.g. in paper coating. This has resulted in severe impediments to ease of production and use of the pigments.

Additional prior art pertinent to the present invention includes:

U.S. Pat. No. 3,567,680, issued to Joseph Iannicelli disclosing that mercaptopropyl silanes having the formula:

wherein Z is selected from the group consisting of hydrogen, cation, alkyl, aryl, alkylaryl, arylalkyl and derivatives thereof; X is selected from the group consisting of alkyl, alkylaryl, and arylalkyl; and R1, R2 and R3 are selected from the group consisting of hydrogen, cation and alkyl, are suitable for modifying kaolin clays to enable them to be used as reinforcing fillers for elastomers. It may be noted that in Iannicelli, only the trialkoxy mercaptopropyl silanes are considered. Blends of these mercapto organosilanes with amino organosilanes are also disclosed.

U.S. Pat. No. 3,364,059, to Marzocchi, discloses a method for treating glass fibers to improve their bonding relationship to rubbers by treating them with a silane containing a thio group.

In U.S. Pat. No. 3,834,924, to Thomas G. Grillo, an amino organosilane is added to a high solids content pigment dispersion or slurry to change the slurry form into a thick, flocculated and plastic type that is suitable for extrusion and drying. Because a thick, cake-like product is formed, the amino organosilane and pigment dispersion are preferably mixed or blended directly in a solids mixing apparatus such as an extruder, designed to extrude the plastic mass in the form of a compacted rod type body which may be fed directly into a drier. The products are useful as a filler for polyurethanes. As can be seen, the described treatment is for the different purpose of forming a flocculated, plastic mass of the kaolin, not for the purpose of aggregating fine kaolin particles to form aggregated fine kaolin particles.

In U.S. Pat. No. 3,894,882, to Robert B. Takewell et al., a rotating pelletizing drum is used to form pellets from clay such as kaolin clay. To avoid the problem of dust, a wetting liquid is introduced into the drum, preferably steam or steam/water. The steam adds heat to the pellets to aid in drying them. There is an incidental mention of using "other suitable wetting liquids", an extensive list being given which includes silanes.

In accordance with the foregoing, an object of the present invention is to provide an improved process for producing an aggregated composite pigment product which possesses improved pigment bulk, porosity and light scattering characteristics, and hence is useful as a bulking pigment for coating of paper and paper board, and which may also be used as an opacifier and light scattering filler for paper and paper board as well as in other paper manufacturing applications.

A further object of this invention is to provide a method for producing a chemically aggregated composite pigment by means of a process which permits handling and treatment of the feed in a substantially dry state, and which yet produces aggregates having sufficient strength to enable their effective use in coating applications.

SUMMARY OF THE INVENTION

In our U.S. Pat. No. 5,298,066, a fine particle size kaolin feed is chemically aggregated to achieve the above objects. In effecting the aggregation it is also contemplated that up to 5% by weight of calcium carbonate may be usefully added as an aggregation enhancing agent. Now, however, and in accordance with the present invention, a method is provided for producing a composite pigment based on both kaolin and one or more additional feed minerals, which provides enhanced optical and printability properties when used in paper manufacture, and which enables further versatility in choice of performance characteristics. Pursuant to the invention a mixture of a substantially dry fine particle size kaolin with up to 50% by weight of a particulate pigment selected from one or more members of the group consisting of ground calcium carbonate ("GCC"), precipitated calcium carbonate ("PCC"), and titanium dioxide, is contacted with a solution of an aggregating agent comprising a previously hydrolyzed organo-silicon compound selected from the group consisting of symmetric compounds having the formula where R= $CH_3$, $C_2H_5$, $C_3H_7$, n--$C_4H_9$ sec-$C_4H_9$ and $C_6H_5$ and asymmetric compounds having the formula where R=$C_2H_5$, X=Cl or Br, and R'=H; and an aggregated composite particulate kaolin pigment is thereupon recovered as product.

The solution of aggregating agent and the feed mixture are preferably contacted with one another by being commonly dispersed in a gas phase—e.g. in air. Preferably the feed mixture is provided as an air suspension, and the aggregating solution as an aerosol is intermixed with the feed suspension, e.g. in a turbulent mixing device such as a Turbulizer®. The aggregating solution can also be sprayed as an aerosol into a suspension of the feed mixture as the latter passes through a duct, or as the latter falls in curtain fashion from the end of a continuous loop conveyor feed belt. Similarly, the aggregating agent may be contacted directly with the feed mixture by being injected or otherwise added to a container for the feed, with vigorous mechanical mixing being used to effect intimate contact between the feed mixture and the aggregating agent.

Preferred aggregating agents for use in the invention include tetramethoxy silane and tetraethoxy silane, each of which has been previously hydrolyzed.

Where the feed mixture contains a GCC or PCC, particularly effective aggregation is achieved where the carbonate content is in the range of 5 to 30% by weight of the total dry feed. From 0 to 20% of titanium dioxide may be present in this mixture with the balance being the particulate kaolin. More generally, where both $TiO_2$ and a carbonate or carbonates are present, the ratio by weight between the $TiO_2$ content and carbonate content can be in the range of from 1:9 to 9:1.

In a typical process, the substantially dry fine particle size pigment mixture is treated with an effective amount of a compound prepared by hydrolyzing an organosilane. Preferably at least 90% by weight of the feed particles are of less than 2 μm E.S.D. Typically from about 0.5 to 3% hydrolyzed organosilane, is mixed with the composite feed, based on the dry weight of feed, with the treating solution of the aggregating agent typically containing about 60% by weight of the organosilane. The products are recovered directly from the mixing, e.g. from the Turbulizer® or from the mixing container or chamber. Where tetraethoxy silane ("TEOS") is used, a still more preferred range is from about 2.2 to 3.0% hydrolized TEOS based on the weight of the dry feed. The resulting products when used in paper making, will exhibit increased light scatter, improved wet void volume and bulk. The aggregates will be found to have high structural integrity, i.e. they will be strong enough to withstand the high shear forces of paper making and paper coating.

The organic silicon compound is hydrolyzed by mixing the compound with water in approximately a molar ratio to the silicon compound, preferably together with an alcohol having solvating properties for both the water and the silicon compound, and a catalytically active quantity of an acid or base catalyst for the hydrolysis. Although the hydrolysis can proceed in the absence of the alcohol, it is preferred to have same present in order to facilitate the reaction by completion within a commercially desirable brief duration. In the presence of the solvating alcohol, about 2 to 3 minutes is typically required to complete hydrolysis. The alcohol can comprise among others, ethanol, methanol or isopropanol, with ethanol being particularly preferred because of its availability and relatively low toxicity. It is important to utilize the hydrolyzed organic silicon compound in a freshly prepared condition, as the nascent silicic acid which is formed during the hydrolysis will otherwise rapidly lose its activity for use in the present processes, as it begins to polymerize. The resulting hydrolyzed organic silicon compound is therefore preferably brought into contact with the feed mixture to be aggregated within 24 hours of its hydrolysis, and more preferably within 14 hours of its hydrolysis.

The quantity of water added for the hydrolysis is preferably on about a mole to mole basis with the silicon compound, or slightly less where moisture on the clay can make up the difference. Excess water is preferably avoided, since it can prematurely hasten polymerization of the product with undesired precipitation.

BRIEF DESCRIPTION OF THE DRAWINGS

In the drawings appended hereto.

DESCRIPTION OF PREFERRED EMBODIMENTS

The invention is demonstrated in the following Examples which are intended to be illustrative but not limiting.

Example 1

Procedure:

500 dry grams of a kaolin/GCC (ground calcium carbonate) composite were prepared using the following percentages of GCC:

0%=0 g GCC+ 500 g kaolin
5%=25 g GCC+ 475 g kaolin
20%=100 g GCC+400 g kaolin
50%=250 g GCC+250 g kaolin The GCC utilized was the Carbitol® 90 product of the assignee, which has a PSD of 90%< 2μ.

A pre-hydrolyzed tetraethyl orthosilicate (TEOS) solution was prepared in a 600 ml beaker using the following concentrations added in the same order:

| | |
|---|---|
| TEOS | 100 g |
| Ethyl alcohol | 138 g |
| Sulfuric Acid | 0.4 g |
| Deionized water | 78 g |

A stirring bar was placed in the TEOS solution and the solution was mixed on the magnetic stirrer for about 5–10 minutes. The hydrolysis reaction of TEOS took place first and then the condensation reaction followed. 500 dry grams of the kaolin/GCC sample were placed in a one gallon stainless steel Waring blender container. A one gallon plastic bag was placed over the lid of the blender container and clamped into place. The sample was pulverized with the mixer set at high speed and rheostat set at 100% for one minute. The speed controlling rheostat was reduced to 40% and 40 ml of TEOS solution was injected onto the sample by using a 60 cc syringe with 12" 18 gauge needle over a period of 30 seconds. Once the TEOS solution was injected and syringe removed from blender, the rheostat was reset to 100% for 15 seconds to ensure homogenous mixture of components. The contents of the blender container were emptied into a one gallon plastic bag and the bag sealed. The sample was allowed to stand overnight before makedown.

The sample was then made down with a dispersant as a 61% solids slurry. The Brookfield viscosity was determined at 10 and 100 rpm setting using a #2 spindle. Thereafter, the high shear viscosity was determined using a Kaltec Hercules high shear viscometer with 'A' bob @ 550, 1100, 2200, 4400 rpm settings. If the sample achieved> 18 dynes/cm×10$^{-5}$, the 4400 rpm reading was repeated to determine integrity of the sample aggregates. A portion of sample was then prepared @ 10% solids for determination of particle size distribution using a Micromeritics SediGraph apparatus.

The above procedures were repeated substituting TiO$_2$ and PCC respectively for the GCC. The TiO$_2$ had an average particle size of 0.47 μm; and the PCC 0.85 μm.

Thereafter similar samples were prepared and tested using a combination of kaolin, TiO$_2$, and GCC in the following concentrations (concentrations are in % of total sample, and represented in the following order: kaolin/TiO$_2$/GCC): 50/45/05, 50/35/15, 50/25/25, 50/15/35, 50/05/45. The samples were then subjected to the same procedures as above.

Figure 1:
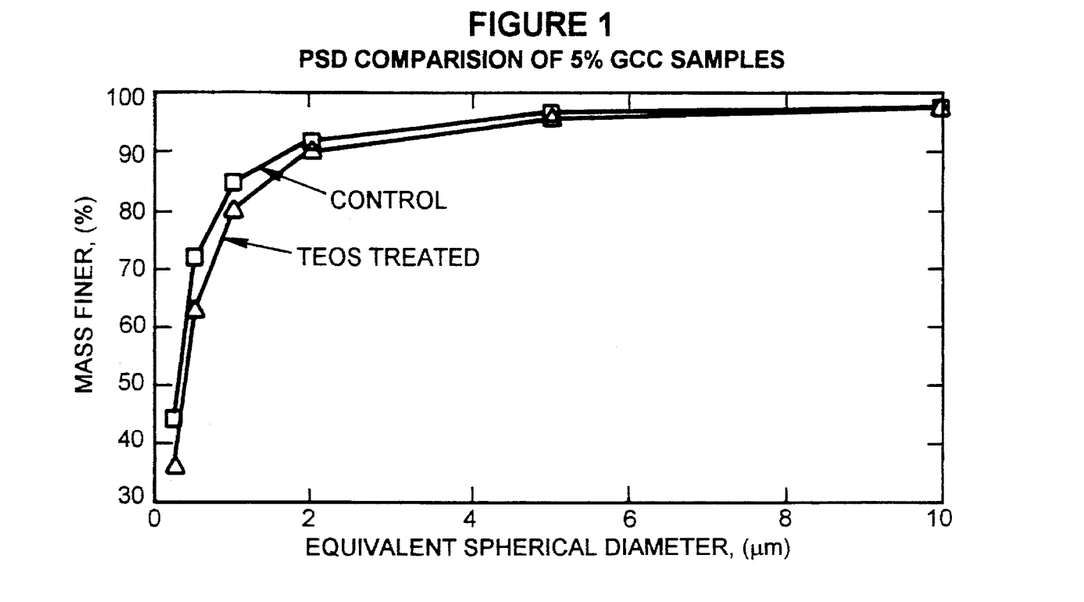
FIG. 1 is a graph which compares the particle size distributions for a starting feed which includes 95% kaolin and 5% GCC, and an aggregated product prepared by treatment of the feed with 2.2% equivalent tetraethoxysilane, as described in Example 1.
Figure 2:
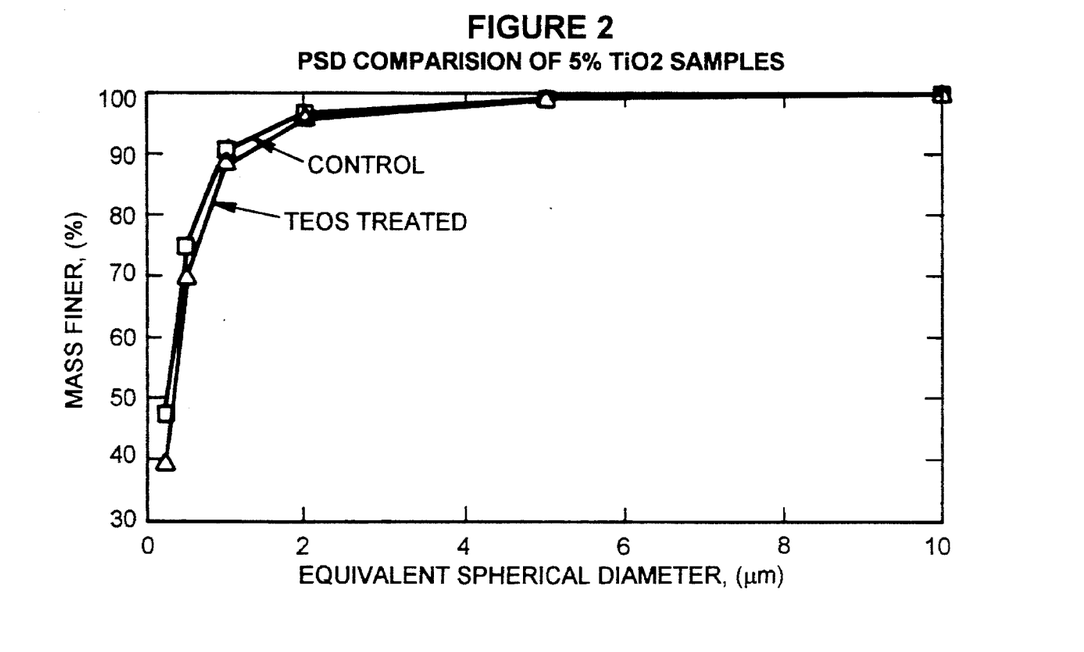
FIG. 2 is a graph which compares the particle size distributions for a starting feed which includes 95% kaolin and 5% TiO$_2$, and an aggregated product prepared by treatment of the feed with 2.2% equivalent tetraethoxysilane, as described in Example 1.
Figure 3:
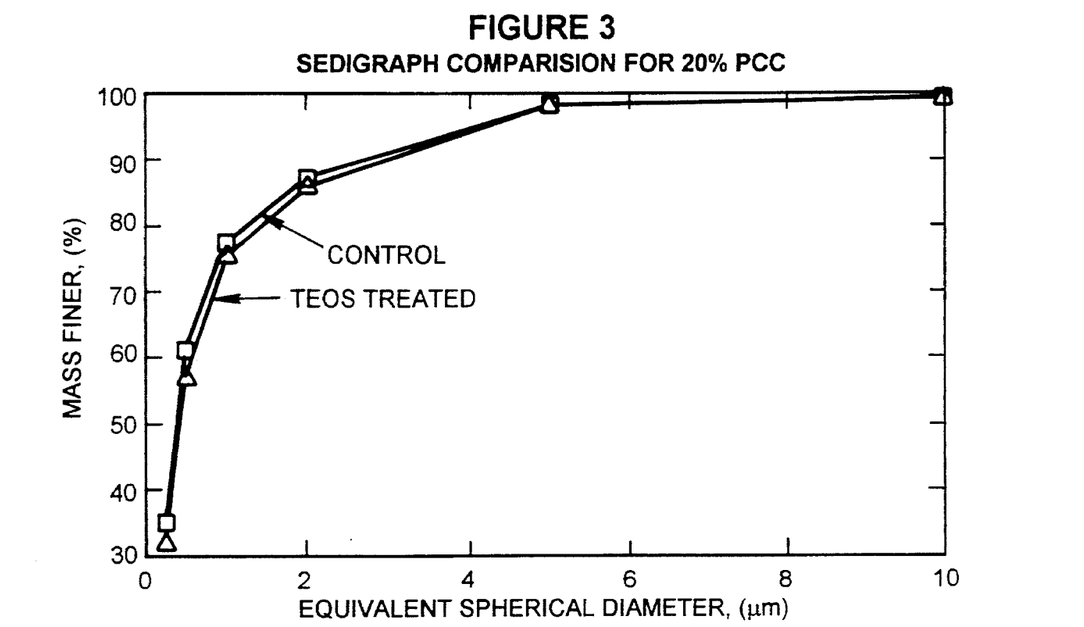
FIG. 3 is a graph which compares the particle size distributions for a starting feed which includes 80% kaolin and 20% PCC, and an aggregated product prepared by treatment of the feed with 2.2% equivalent tetraethoxysilane, as described in Example 1.
Figure 4:
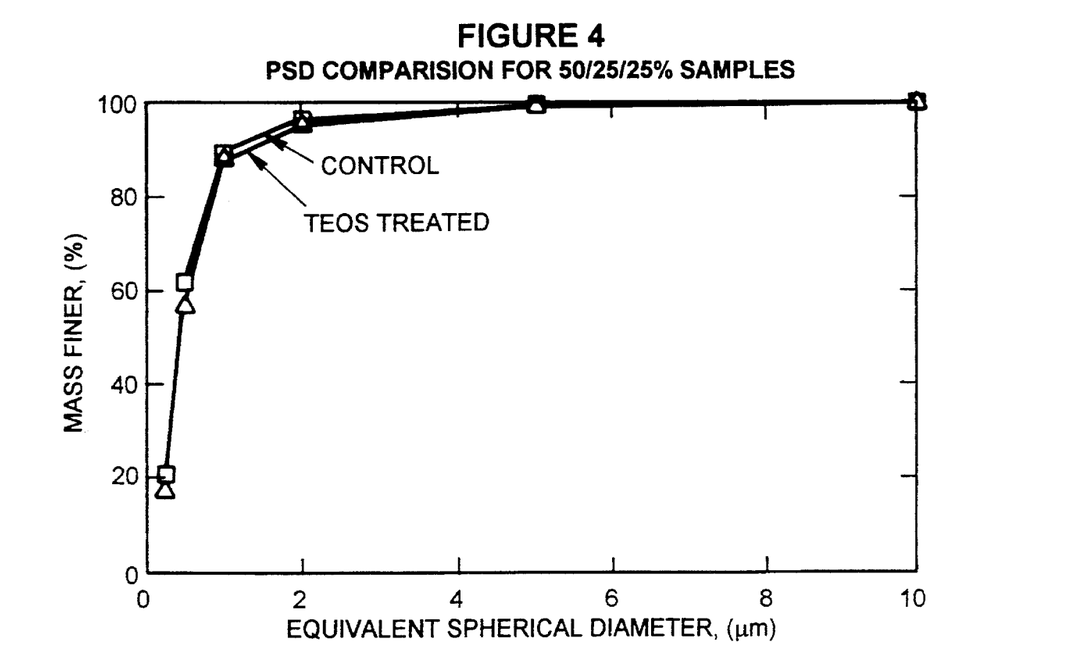
FIG. 4 is a graph which compares the particle size distributions for a starting feed which includes 50/25/25% kaolin/TiO$_2$/GCC, and an aggregated product prepared by treatment of the feed with 2.2% equivalent tetraethoxysilane, as described in Example 1.

Results:

Aggregation was found in all the composites. High particle aggregation of clay with ground carbonate is at ratio 80% clay/20% GCC as shown in Table 1. Table 2, Table 3, and Table 4 indicated the aggregation of clay/TiO$_2$, clay/PCC, and clay/TiO$_2$/GCC. The addition of TEOS solution also narrowed down the particle size distribution as shown from FIG. 1 to FIG. 4. Optimum composite ratios for clay/GCC and clay/PCC are approximately from 5% to 30% GCC and PCC, which would be expected to have better opacity, smoothness, sheet gloss, and printability.

TABLE 1

Chemically Structured Pigments

Kaolin pigments with varying concentrations of CaCO3 and TiO2
Chemically aggregated using a hydrolyzed organo-silane solution Rheology effects:

| CaCO3 (C-90) | | | Control (not treated with TEOS) | | | |
|---|---|---|---|---|---|---|
| | Brookfield Viscosity | | Hercules High Shear (Torque, Dyne/CM × 10e-5) | | | |
| RPM setting: | 10 | 100 | 550 | 1100 | 2200 | 4400 |
| 0% C90 | 276 | 104.4 | 0.6 | 1.1 | 2.2 | 4.0 |
| 5% C90 | 488 | 144.4 | 0.7 | 1.4 | 2.9 | 7.0 |
| 20% C90 | 588 | 151.6 | 0.8 | 1.4 | 2.9 | 6.5 |
| 50% C90 | 780 | 179.6 | 0.8 | 1.3 | 2.5 | 5.2 |

| CaCO3 (C-90) | | | Treated with 2.2% TEOS Soln. | | | |
|---|---|---|---|---|---|---|
| | Brookfield Viscosity (cps) | | Hercules High Shear (Torque, Dyne/CM × 10e-5) | | | |
| RPM setting: | 10 | 100 | 550 | 1100 | 2200 | 4400 |
| 0% C90 | 444 | 187.2 | 3.0 | 5.7 | 10.2 | 16.5 |
| 5% C90 | 556 | 211.2 | 6.3 | 11.0 | 18.6 | 31.4 |
| 20% C90 | 632 | 208.8 | 3.8 | 7.4 | 12.7 | 20.7 |
| 50% C90 | 708 | 217.6 | 2.0 | 3.5 | 6.7 | 11.3 |

PSD Results:

| CaCO3 (C-90) | | | Control (not treated with TEOS) | | | | | |
|---|---|---|---|---|---|---|---|---|
| | | | 0% C90 | | 5% C90 | 20% C90 | | 50% C90 |
| % Finer Than | 10 | μm | 99.4 | | 97.6 | 96.6 | | 99.5 |
| | 5 | μm | 99.7 | | 96.7 | 94.5 | | 97.3 |
| | 2 | μm | 95.9 | | 91.9 | 87.5 | | 88.4 |
| | 1 | μm | 90.0 | | 84.8 | 76.7 | | 71.1 |
| | 0.5 | μm | 79.0 | | 72.0 | 60.4 | | 49.7 |
| | 0.25 | μm | 52.6 | | 44.2 | 36.3 | | 27.8 |
| CaCO3 (C-90) | | | Treated with 2.2% TEOS Soln. | | | | | |
| | | | 0% C90 | % Change | 5% C90 | % Change | 20% C90 | % Change | 50% C90 | % Change |
| % Finer Than | 10 | μm | 99.1 | 0.3 | 98.0 | −0.4 | 98.0 | −1.4 | 89.3 | 10.2 |
| | 5 | μm | 97.8 | 1.9 | 95.6 | 1.1 | 92.6 | 1.9 | 81.7 | 15.6 |
| | 2 | μm | 92.6 | 3.3 | 90.1 | 1.8 | 70.7 | 16.8 | 69.8 | 18.6 |
| | 1 | μm | 85.3 | 4.7 | 80.1 | 4.7 | 49.0 | 27.7 | 54.5 | 16.6 |
| | 0.5 | μm | 71.2 | 7.8 | 62.7 | 9.3 | 27.2 | 33.2 | 36.9 | 13.8 |
| | 0.25 | μm | 43.6 | 9.0 | 35.9 | 8.3 | 15.5 | 19.8 | 18.1 | 9.7 |

TABLE 2

Chemically Structured Pigments

Kaolin pigments with varying concentrations of CaCO3 and TiO2
Chemically aggregated using a hydrolyzed organo-silane solution Rheology effects:

| TiO2 (Anatase) | | | Control (not treated with TEOS) | | | |
|---|---|---|---|---|---|---|
| | Brookfield Viscosity | | Hercules High Shear (Torque, Dyne/CM × 10e-5) | | | |
| RPM setting: | 10 | 100 | 550 | 1100 | 2200 | 4400 |
| 0% TiO2 | 440 | 145.6 | 0.5 | 1.0 | 2.0 | 4.7 |
| 5% TiO2 | 412 | 147.6 | 0.6 | 1.1 | 2.3 | 5.2 |
| 20% TiO2 | 356 | 132.0 | 0.6 | 1.2 | 2.6 | 6.4 |
| 50% TiO2 | 536 | 164.8 | 0.8 | 1.6 | 3.3 | 8.3 |

| TiO2 (Anatase) | | | Treated with 2.2% TEOS Soln. | | | |
|---|---|---|---|---|---|---|
| | Brookfield Viscosity (cps) | | Hercules High Shear (Torque, Dyne/CM × 10e-5) | | | |
| RPM setting: | 10 | 100 | 550 | 1100 | 2200 | 4400 |
| 0% TiO2 | 516 | 220.8 | 5.1 | 7.7 | 12.0 | 16.7 |

TABLE 2-continued

Chemically Structured Pigments

Kaolin pigments with varying concentrations of CaCO3 and TiO2
Chemically aggregated using a hydrolyzed organo-silane solution

| | | | | | | |
|---|---|---|---|---|---|---|
| 5% TiO2 | 408 | 188.4 | 4.6 | 7.5 | 12.2 | 18.9 |
| 20% TiO2 | 380 | 157.2 | 3.1 | 6.9 | 13.2 | 24.5 |
| 50% TiO2 | 556 | 180.8 | 3.1 | 6.7 | 12.5 | 23.7 |

PSD Results:

| TiO2 (Anatase) | | | Control (not treated with TEOS) | | | |
|---|---|---|---|---|---|---|
| | | 0% TiO2 | 5% TiO2 | 20% TiO2 | 50% TiO2 | |
| % Finer Than | 10 μm | 99.8 | 99.7 | 94.5 | 99.9 | |
| | 5 μm | 99.4 | 99.0 | 92.6 | 99.7 | |
| | 2 μm | 96.9 | 96.7 | 90.0 | 98.2 | |
| | 1 μm | 91.0 | 90.7 | 83.2 | 91.7 | |
| | 0.5 μm | 80.1 | 74.9 | 56.8 | 57.3 | |
| | 0.25 μm | 54.3 | 47.1 | 27.8 | 17.8 | |

| TiO2 (Anatase) | | | | | Treated with 2.2% TEOS Soln. | | | |
|---|---|---|---|---|---|---|---|---|
| | | 0% TiO2 | % Change | 5% TiO2 | % Change | 20% TiO2 | % Change | 50% TiO2 | % Change |
| % Finer Than | 10 μm | 99.2 | 0.6 | 99.8 | −0.1 | 98.8 | −4.3 | 99.6 | 0.4 |
| | 5 μm | 98.5 | 0.9 | 99.2 | −0.2 | 98.9 | −6.3 | 98.5 | 1.2 |
| | 2 μm | 94.4 | 2.5 | 95.6 | 1.1 | 96.4 | −6.4 | 96.0 | 2.2 |
| | 1 μm | 87.5 | 3.5 | 88.3 | 2.4 | 88.2 | −5.0 | 86.2 | 5.5 |
| | 0.5 μm | 73.8 | 6.3 | 69.6 | 5.3 | 59.4 | −2.6 | 46.6 | 10.8 |
| | 0.25 μm | 45.1 | 9.2 | 38.8 | 8.3 | 25.5 | 2.3 | 13.0 | 4.8 |

TABLE 3

Chemically Structured Pigments

Kaolin pigments with varying concentrations of CaCO3 and TiO2
Chemically aggregated using a hydrolyzed organo-silane solution

Rheology effects:

| CaCO3 (PCC Aragonite) | | | Control (not treated with TEOS) | | | |
|---|---|---|---|---|---|---|
| | Brookfield Viscosity | | Hercules High Shear (Torque, Dyne/CM × 10e-5) | | | |
| RPM setting: | 10 | 100 | 550 | 1100 | 2200 | 4400 |
| 0% PCC | 420 | 131.6 | 0.6 | 1.1 | 2.2 | 5.0 |
| 5% PCC | 608 | 180.0 | 1.0 | 1.8 | 4.3 | 10.0 |
| 20% PCC | 508 | 224.8 | 3.8 | 8.7 | 19.3 | 34.4 |
| 50% PCC | 712 | 401 | 48.4 | 79.2 | 132.0 | 237.5 |

| CaCO3 (PCC Aragonite) | | | Treated with 2.2% TEOS Soln. | | | |
|---|---|---|---|---|---|---|
| | Brookfield Viscosity (cps) | | Hercules High Shear (Torque, Dyne/CM × 10e-5) | | | |
| RPM setting: | 10 | 100 | 550 | 1100 | 2200 | 4400 |
| 0% PCC | 552 | 219.6 | 4.6 | 7.2 | 11.4 | 16.3 |
| 5% PCC | 520 | 228.8 | 8.3 | 14.2 | 26.7 | 47.3 |
| 20% PCC | 416 | 250.4 | 17.5 | 29.2 | 53.1 | 99.1 |
| 50% PCC | 412 | 308.0 | 65.9 | 112.2 | 191.3 | 336.6 |

PSD Results:

| CaCO3 (PCC Aragonite) | | | Control (not treated with TEOS) | | | |
|---|---|---|---|---|---|---|
| | | 0% PCC | 5% PCC | 20% PCC | 50% PCC | |
| % Finer Than | 10 μm | 99.2 | 98.8 | 99.3 | 99.8 | |
| | 5 μm | 99.4 | 99.1 | 98.2 | 98.8 | |
| | 2 μm | 95.1 | 92.7 | 87.2 | 80.2 | |
| | 1 μm | 88.6 | 85.3 | 77.4 | 69.0 | |
| | 0.5 μm | 76.9 | 72.4 | 61.1 | 47.1 | |
| | 0.25 μm | 52.7 | 46.9 | 35.0 | 21.3 | |

| CaCO3 (PCC Aragonite) | | | | | Treated with 2.2% TEOS Soln. | | | |
|---|---|---|---|---|---|---|---|---|
| | | 0% PCC | % Change | 5% PCC | % Change | 20% PCC | % Change | 50% PCC | % Change |
| % Finer Than | 10 μm | 98.4 | 0.8 | 99.6 | −0.8 | 99.6 | −0.3 | 99.1 | 0.7 |
| | 5 μm | 97.0 | 2.4 | 98.5 | 0.6 | 98.0 | 0.2 | 97.9 | 0.9 |

TABLE 3-continued

Chemically Structured Pigments

Kaolin pigments with varying concentrations of CaCO3 and TiO2
Chemically aggregated using a hydrolyzed organo-silane solution

| | | | | | | | | |
|---|---|---|---|---|---|---|---|---|
| 2 μm | 91.7 | 3.4 | 91.1 | 1.6 | 85.8 | 1.4 | 79.1 | 1.1 |
| 1 μm | 84.4 | 4.2 | 82.5 | 2.8 | 75.3 | 2.1 | 67.9 | 1.1 |
| 0.5 μm | 71.6 | 5.3 | 67.2 | 5.2 | 56.6 | 4.5 | 42.0 | 5.1 |
| 0.25 μm | 46.7 | 6.0 | 41.9 | 5.0 | 31.9 | 3.1 | 17.5 | 3.8 |

TABLE 4

Chemically Structured Pigments

Kaolin pigments with varying concentrations of CaCO3 and TiO2
Chemically aggregated using a hydrolyzed organo-silane solution Rheology effects:

| Kaolin/TiO2/GCC | Brookfield Viscosity | | Control (not treated with TEOS) Hercules High Shear (Torque, Dyne/CM × 10e-5) | | | |
|---|---|---|---|---|---|---|
| RPM setting: | 10 | 100 | 550 | 1100 | 3200 | 4400 |
| 50/45/05 % | 836 | 216.4 | 0.7 | 1.3 | 3.2 | 8.8 |
| 50/35/15 % | 524 | 161.6 | 0.6 | 1.0 | 2.4 | 5.9 |
| 50/25/25 % | 524 | 143.2 | 0.6 | 1.1 | 2.4 | 5.3 |
| 50/15/35 % | 604 | 154.8 | 0.6 | 1.1 | 2.3 | 5.2 |
| 50/05/45 % | 728 | 177.2 | 0.6 | 1.2 | 2.4 | 5.4 |
| Kaolin/TiO2/GCC | Brookfield Viscosity (cps) | | Treated with 2.2% TEOS Soln. Hercules High Shear (Torque, Dyne/CM × 10e-5) | | | |
| RPM setting: | 10 | 100 | 550 | 1100 | 3200 | 4400 |
| 50/45/05 % | 364 | 145.6 | 2.1 | 5.6 | 10.1 | 16.2 |
| 50/35/15 % | 404 | 143.6 | 1.4 | 3.8 | 8.0 | 13.9 |
| 50/25/25 % | 488 | 157.2 | 1.7 | 3.8 | 7.6 | 13.1 |
| 50/15/35 % | 596 | 176.4 | 1.7 | 3.7 | 7.2 | 12.6 |
| 50/05/45 % | 684 | 198.4 | 2.2 | 4.2 | 7.8 | 13.1 |

PSD Results:

| Kaolin/TiO2/GCC | | Control (not treated with TEOS) | | | | |
|---|---|---|---|---|---|---|
| | | 50/45/05 % | 50/35/15 % | 50/25/25 % | 50/15/35 % | 50/05/45 % |
| % Finer Than | 10 μm | 100.1 | 99.9 | 99.8 | 99.9 | 99.5 |
| | 5 μm | 99.7 | 99.8 | 99.5 | 99.5 | 99.1 |
| | 2 μm | 98.8 | 98.1 | 96.6 | 96.3 | 93.4 |
| | 1 μm | 96.2 | 93.8 | 89.6 | 87.3 | 79.5 |
| | 0.5 μm | 66.0 | 64.5 | 61.9 | 62.4 | 57.1 |
| | 0.25 μm | 16.3 | 18.3 | 20.8 | 25.4 | 28.9 |

| Kaolin/TiO2/GCC | | Treated with 2.2% TEOS Soln. | | | | | | | | |
|---|---|---|---|---|---|---|---|---|---|---|
| | | 50/45/05 % | % Change | 50/35/15 % | % Change | 50/25/25 % | % Change | 50/15/35 % | % Change | 50/05/45 % | % Change |
| % Finer Than | 10 μm | 100.1 | 0.0 | 99.3 | 0.6 | 99.9 | -0.1 | 99.9 | 0.0 | 99.9 | -0.4 |
| | 5 μm | 99.5 | 0.2 | 97.4 | 2.4 | 99.1 | 0.4 | 98.9 | 0.6 | 98.5 | 0.6 |
| | 2 μm | 98.0 | 0.8 | 93.9 | 4.2 | 95.2 | 1.4 | 95.5 | 0.8 | 91.3 | 2.1 |
| | 1 μm | 94.6 | 1.6 | 88.6 | 5.2 | 87.6 | 2.0 | 86.7 | 0.6 | 76.9 | 2.6 |
| | 0.5 μm | 59.7 | 6.3 | 56.7 | 7.8 | 56.9 | 5.0 | 58.6 | 3.8 | 52.9 | 4.2 |
| | 0.25 μm | 14.0 | 2.3 | 15.0 | 3.3 | 17.3 | 3.5 | 20.5 | 4.9 | 23.5 | 5.4 |

The feed mixture to be aggregated may in one preferred procedure, be provided to a Turbulizer® and reacted with an aerosol of a solution of aggregating agent as described in the foregoing Example.

The Turbulizer® (manufactured by Bepex Corporation of Minneapolis, Minn.), is a continuous mixing device including a horizontally oriented cylindrical chamber in which pitched blades are journaled about a horizontal axis and are rotated at high speed. The feed mixture suspended in air will enter the chamber peripherally toward one end. Three spray nozzles fed with the aggregation solution and compressed air disperse the aggregating solution as an aerosol, the nozzles being mounted at spaced points along the wall of the Turbulizer® to inject the aerosol directly to the interior of the chamber for mixing with the feed mixture suspension. The treated feed clay emerging from the Turbulizer® is then taken as the aggregated pigment product.

Example 2

An aggregating solution of tetraethoxysilane (TEOS) was used to treat a feed mixture as in Example 1 above, except that 3.00% of the (TEOS) aggregating agent is added based on the dry equivalent weight of feed. The sub- 0.25 μm content is reduced in comparison to the feed mixture demonstrating that aggregation has occurred.

While the present invention has been particularly set forth in terms of specific embodiments thereof, it will be understood in view of the present disclosure, that numerous variations upon the invention are now enabled to those skilled in the art, which variations yet reside within the scope of the instant teachings. Accordingly, the invention is to be broadly construed, and limited only by the scope and spirit of the claims now appended hereto.

What is claimed is:

1. A method for producing a chemically aggregated composite pigment providing enhanced optical and printability properties when used in paper manufacture, which comprises hydrolyzing an organosilane selected from the group consisting of symmetric compounds having the formula where R=$CH_3$, $C_2H_5$, $C_3H_7$, n-$C_4H_9$ sec-$C_4H_9$ and $C_6H_5$ and asymmetric compounds having the formula where R=$C_2H_5$, X=Cl or Br, and R'=H, to form a hydrolyzed organosilane aggregating agent solution;

contacting a substantially dry fine particle size feed mixture of a kaolin and up to 50% by weight of a particulate pigment selected from one or more members of the group consisting of ground calcium carbonate, precipitated calcium carbonate, and titanium dioxide, with said solution; and recovering an aggregated particulate composite pigment as product.

2. A method in accordance with claim 1, wherein said solution is formed into an aerosol for said contacting with said feed mixture.

3. A method in accordance with claim 2, wherein said aerosol is sprayed onto said feed mixture.

4. A method in accordance with claim 2, wherein said solution and said feed mixture are contacted with one another while being commonly dispersed in and mixed in a gas phase.

5. A method in accordance with claim 4, wherein said feed mixture and said solution are mixed in a chamber provided with an agitator.

6. A method in accordance with claim 1, wherein said feed mixture and said solution are mixed in a chamber provided with an agitator.

7. A method in accordance with claim 1, wherein said solution is added in an amount of 0.5 to 3% hydrolyzed organosilane, based on dry weight of said feed mixture.

8. A method in accordance with claim 7, in which the organosilane is hydrolyzed by mixing said organosilane with water in approximately a mole to mole ratio to said organosilane, together with a catalytically active quantity of an acid or base catalyst for said hydrolysis.

9. A method in accordance with claim 8, further including mixing with said organosilane and water, an alcohol having solvating properties for both said water and said silicon compound.

10. A method in accordance with claim 9, in which said alcohol comprises ethanol.

11. A method in accordance with claim 9, in which said alcohol comprises methanol.

12. A method in accordance with claim 9, in which the resulting hydrolyzed organosilane is contacted with said feed mixture within 24 hours of its hydrolysis.

13. A method in accordance with claim 9, in which the resulting hydrolyzed organosilane is contacted with said feed mixture within 14 hours of its hydrolysis.

14. A method in accordance with claim 9, in which said organosilane comprises tetraethoxysilane.

15. A method in accordance with claim 9, in which said organosilane comprises tetramethoxysilane.

16. A method in accordance with claim 1, in which the feed mixture includes from 5 to 30% by dry weight of a ground calcium carbonate and/or a precipitated calcium carbonate.

17. A method in accordance with claim 1, in which the feed mixture includes titanium dioxide and one or both of said carbonates, the weight ratio between titanium dioxide and carbonate content being in the range of 1:9 to 9:1.

18. A method in accordance with claim 2, in which at least 90% by weight of the feed kaolin particles are finer than 2 micrometers E.S.D.

19. A method in accordance with claim 18, wherein said solution is added in an amount of 0.5 to 3% hydrolyzed organosilane based on weight of said feed mixture.

20. A method in accordance with claim 18, in which the organosilane is hydrolyzed by mixing said organosilane with water in approximately a mole to mole ratio, together with a catalytically active quantity of an acid or base catalyst for said hydrolysis.

21. A method in accordance with claim 19, further including mixing with said organosilane and water, an alcohol having solvating properties for both said water and said organosilane.

22. A method in accordance with claim 20, in which said alcohol comprises ethanol.

23. A method in accordance with claim 20, in which said alcohol comprises methanol.

24. A method in accordance with claim 20, in which the resulting hydrolyzed organosilane is contacted with said feed mixture within 24 hours of its hydrolysis.

25. A method in accordance with claim 20, in which the resulting hydrolyzed organosilane is contacted with said feed mixture within 14 hours of its hydrolysis.

26. A method in accordance with claim 20, in which said organosilane comprises tetraethoxysilane.

27. A method in accordance with claim 20, in which said organosilane comprises tetramethoxysilane.

28. A method in accordance with claim 1, in which at least 90% by weight of the feed kaolin particles are finer than 2 micrometers E.S.D.

* * * * *